US007050513B1

(12) United States Patent
Yakhnich

(10) Patent No.: US 7,050,513 B1
(45) Date of Patent: May 23, 2006

(54) BLOCK BASED CHANNEL TRACKING USING WEIGHTED RECURSIVE LEAST SQUARES

(75) Inventor: Evgeny Yakhnich, Hadera (IL)

(73) Assignee: Comsys Communications & Signal Processing Ltd., Herzelia (IL)

(*) Notice: Subject to any disclaimer, the term of this patent is extended or adjusted under 35 U.S.C. 154(b) by 843 days.

(21) Appl. No.: 09/789,835

(22) Filed: Feb. 20, 2001

(51) Int. Cl.
H03D 7/00 (2006.01)
H03H 7/30 (2006.01)
H04L 5/12 (2006.01)
H04B 1/10 (2006.01)

(52) U.S. Cl. .................. 375/341; 375/233; 375/265; 375/350

(58) Field of Classification Search ............ 375/341, 375/233, 232
See application file for complete search history.

(56) References Cited

U.S. PATENT DOCUMENTS

| 5,231,648 | A | * | 7/1993 | Driedger et al. ............ 375/231 |
| 5,436,929 | A | * | 7/1995 | Kawas Kaleh .............. 375/233 |
| 5,790,598 | A | * | 8/1998 | Moreland et al. ........... 375/233 |
| 6,084,929 | A |   | 7/2000 | Molnar et al. .............. 375/350 |
| 6,320,919 | B1 | * | 11/2001 | Khayrallah et al. ......... 375/347 |
| 6,347,125 | B1 | * | 2/2002 | Dent .......................... 375/341 |
| 6,775,322 | B1 | * | 8/2004 | Zangi et al. ................. 375/232 |

OTHER PUBLICATIONS

Haykin, Simon, Adaptive Filter Theory, Prentice Hall, 1996, pp. 276-280, 562-588.

Press, William, et al., Numerical Recipes in C, The Art of Scientific Computing, Cambridge University Press, 1992, pp. 96-97.

Raheli, Riccardo, et al., "Per-Survivor Processing and Tentative Decisions: What Is In Between?", IEEE Transactions on Communications, vol. 44, No. 2, pp. 127-129, Feb. 1996.

Baccarelli, Enzo, et al., "A Novel Adaptive Receiver with Enhanced Channel Tracking Capability for TDMA-Based Mobile Radio Communications", IEEE Journal on Selected Areas in Communications, vol. 16, No. 9, pp. 1630-1639, Dec. 1998.

Castellini, Guido, et al., "A Continuously Adaptive MLSE Receiver for Mobile Communications: Algorithm and Per (Continued)

*Primary Examiner*—Chieh M. Fan
*Assistant Examiner*—Cicely Ware
(74) *Attorney, Agent, or Firm*—Zaretsky & Associates PC; Howard Zaretsky

(57) ABSTRACT

A novel and useful channel tracking mechanism operative to generate channel estimate updates on blocks of samples during reception of a message. The tracking mechanism is based on the weighted recursive least squares algorithm and implements the estimation process by recursively updating channel model parameters upon the arrival of new sample data. The mechanism is operative to update channel estimate information once per sample block. An interblock exponential weighting factor is also applied. The block length is chosen short enough to enable good tracking performance while being sufficiently long enough to minimize the overhead of generating preliminary decisions and of updating precalculated tables in the equalizer. The method of the invention can be performed in either hardware or software. A computer comprising a processor, memory, etc. is operative to execute software adapted to perform the channel tracking method of the present invention.

60 Claims, 7 Drawing Sheets

OTHER PUBLICATIONS formance", IEEE Transactions on Communications, vol. 45, No. 1, pp. 80-89, Jan. 1997.

Han, Youngyearl, "On The Minimization of Overhead in Channel Impulse Response Measurement", IEEE Transactions on Vehicular Technology, vol. 47, No. 2, pp. 631-636, May 1998.

Boss, Dieter, et al., "Impact of Blind Versus Non-Blind Channel Estimation on the BER Performance of GSM Receivers", IEEE Signal Processing Workshop on Higher-Order Statistics, pp. 62-66, Jul. 21-23, 1997.

Mehrotra, Asha, GSM System Engineering, Artech House Inc., 1997, pp. 169-245.

Haykin, Simon, Adaptive Filter Theory, Prentice Hall, 1996, pp. 483-535.

U.S. Appl. No. 09/616,161, filed Jul. 14, 2000, Yakhnich et al.

* cited by examiner

BLOCK BASED CHANNEL TRACKING USING WEIGHTED RECURSIVE LEAST SQUARES

REFERENCE TO RELATED APPLICATION

The subject matter of the present application is related to and may be advantageously combined with the subject matter of U.S. Pat. No. 6,907,092, to Yakhnich et al, entitled "Method of Channel Order Selection and Channel Order Estimation in a Wireless Communication System," incorporated herein by reference in its entirety.

FIELD OF THE INVENTION

The present invention relates generally to communication systems and more particularly relates to an apparatus for and a method of channel tracking suitable for use with fading mobile radio channels.

BACKGROUND OF THE INVENTION

In recent years, the world has witnessed explosive growth in the demand for wireless communications and it is predicted that this demand will increase in the future. There are already over 500 million users that subscribe to cellular telephone services and the number is continually increasing. Eventually, in the not too distant future the number of cellular subscribers will exceed the number of fixed line telephone installations. Already, in many cases, the revenues from mobile services exceeds that for fixed line services even though the amount of traffic generated through mobile phones is much less than in fixed networks.

Other related wireless technologies have experienced growth similar to that of cellular. For example, cordless telephony, two way radio trunking systems, paging (one way and two way), messaging, wireless local area networks (WLANs) and wireless local loops (WLLs). In addition, new broadband communication schemes are rapidly being deployed to provide users with increased bandwidth and faster access to the Internet. Broadband services such as xDSL, short range high speed wireless connections, high rate satellite downlink (and the uplink in some cases) are being offered to users in more and more locations.

In connection with cellular services, the majority of users currently subscribe to digital cellular networks. Almost all new cellular handsets sold to customers are based on digital technology, typically second generation digital technology. Currently, third generation digital networks are being designed, developed and tested which will be able to support data packet networks having much higher data rates. The first generation analog systems comprise the well known protocols Advanced Mobile Telephone System (AMPS), Total Access Communications Systems (TACS), etc. The digital systems comprise Global System for Mobile Communication (GSM), GSM EDGE Radio Access Network (GERAN), Time Division Multiple Access (TDMA) (IS-136) or Code Division Multiple Access (CDMA) (IS-95), for example.

Communications receivers such as modems designed for wireless channels employ equalizers to combat the intersymbol interference caused by the time dispersion of the channel. Wireless channels can be characterized as time dispersive, frequency selective fading channels. The characteristics of such channels may change significantly during transmission of a message, in the case of GSM, during an Enhanced General Packet Radio System EGPRS burst. Optimum performance cannot be achieved without tracking such a channel during the burst. Therefore, many systems employ some form of channel tracking which is operative to update the channel model during each burst in order to achieve better performance.

Several adaptive type algorithms are commonly used for channel tracking in wireless modems. These algorithms are used to periodically update the channel estimate during the burst. The most common algorithms include least means squares (LMS) and recursive least squares (RLS). RLS based algorithms are known to have better convergence properties and are asymptotically optimal. The good convergence properties of the RLS algorithm is due to the use of information contained in the input data extending back to the instant of time when the algorithm was initiated. The recursive least squares algorithm starts with known initial conditions while using the information contained in new data samples to update old estimates. The resulting rate of convergence is usually an order of magnitude faster than the LMS algorithm. The improvement, however, is achieved at the expense of an increase in computational complexity over the LMS algorithm.

Although the RLS algorithm has good tracking and convergence properties, a disadvantage is that its use of a relation in matrix algebra known as the matrix inversion lemma causes numerical problems when implemented on fixed-point processors. The finite precision of fixed-point digital signal processors makes such an algorithm difficult to implement.

Another disadvantage is that prior art RLS based tracking algorithms, provide channel updates every sample time thus precluding the use of precalculated tables in the equalizer. This significantly increases the complexity of the equalizer due to the requirement of repeatedly performing convolution calculations for each sample. Normally, the results of the convolution between the samples and the channel estimate, for example, are precalculated and stored in a table within the equalizer since the same calculations need to be performed many times in computing branch metrics while traversing the trellis (such as in RSSE type equalizers).

Moreover, Viterbi type equalizers provide decisions only at the end of the burst after processing the last input sample. Conventional RLS algorithms, however, require decisions each sample. This increases the overhead of the decision generation process and decreases the reliability of the decisions.

It is therefore desirable to provide a mechanism for tracking changes to the channel during a burst that provides good tracking abilities, has good convergence properties, is numerically stable and does not increase the complexity of the equalizer.

SUMMARY OF THE INVENTION

The present invention is a novel and useful channel tracking mechanism that overcomes the disadvantages of the prior art. The channel tracking mechanism is operative to generate channel estimate updates on blocks of samples during reception of a message. The channel estimate updates can then be used to improve the performance of the equalizer. Performance is improved since the equalizer uses more accurate channel model information that tracks changes to the channel during the length of a message. The present invention is suitable for use with a wide range of communication systems and is particularly useful in communication systems where the channel is a frequency selective, time dispersive, fading mobile radio channel.

To aid in understanding the principles of the present invention, the method is described in the context of a channel tracking module in a wireless modem intended for use in a GSM or GERAN cellular system. As described in more detail below, the channel tracking module is adapted to calculate channel estimate updates on blocks of samples using a method based on recursive least squares (RLS) wherein the method utilizes the well known Cholesky decomposition technique in solving the recursive RLS equations. Alternatively, channel tracking may be implemented using other well-known matrix inversion methods and other methods of solving systems of linear equations.

The tracking mechanism is based on the weighted recursive least squares algorithm and implements the estimation process by recursively updating channel model parameters upon the arrival of new sample data. In particular, the correlation matrix Q and the channel estimate ĥ are computed recursively for each block of samples. The tracking mechanism is operative to update channel estimate information once per sample block rather than sample by sample as in the prior art algorithm. In addition, an interblock exponential weighting factor is applied in the solution of the recursive equations.

In practice, the block length is chosen short enough to enable good tracking performance while being sufficiently long enough to minimize the overhead of updating precalculated tables in the equalizer. Thus, the invention enables the efficient use of precalculated tables in the equalizer which functions to greatly reduce the computational complexity of the equalizer.

The method of the invention can be performed in either hardware or software. A computer comprising a processor, memory, etc. is operative to execute software adapted to perform the channel tracking method of the present invention.

The invention provides several advantages. The use of Cholesky decomposition in computing the recursive update equations provides numerical stability when used with finite precision processors. In addition, the decomposition can be implemented in software relatively easily. The use of block tracking also reduces the overhead of decision generation for tracking purposes. This reduces the number of MIPs required to implement the tracking loop.

There is thus provided in accordance with the present invention a method of tracking a channel, the method comprising the steps of dividing a sequence of input samples into a plurality of blocks; for each block, calculating a correlation matrix on a sample block, factoring the correlation matrix, calculating a channel estimate correction factor as a function of the results of the factored correlation matrix, the sample block, data decisions and a previous channel estimate and generating an updated channel estimate as a function of the previous channel estimate and the channel estimate correction factor.

There is also provided in accordance with the present invention an apparatus for tracking a channel comprising initialization means for initializing a correlation matrix in a tracking loop using an initial block of samples, an error generator operative to generate an error for a block of samples, the error comprising the difference between received input samples and estimated input samples, a correction factor generator operative to generate a tracking loop correction factor as a function of the decomposition, data decisions, the error and the estimated input samples, an update mechanism operative to generate an updated channel estimate as a function of a previous channel estimate and the tracking loop correction factor.

There is further provided in accordance with the present invention a communications receiver for receiving and decoding an M-ary transmitted signal, the communications receiver coupled to a fading mobile radio channel comprising a radio frequency (RF) front end circuit for receiving and converting the M-ary transmitted signal to a baseband signal, a demodulator adapted to receive the baseband signal and to generate a received signal therefrom in accordance with the M-ary modulation scheme used to generate the transmitted signal, a tracking module comprising processing means programmed to divide a sequence of input samples into a plurality of blocks; for each block, calculate a correlation matrix on a sample block, factor the correlation matrix, calculate a channel estimate correction factor as a function of the results of the factored correlation matrix, the sample block, data decisions and a previous channel estimate, generate an updated channel estimate as a function of the previous channel estimate and the channel estimate correction factor, an equalizer operative to receive the received signal and to generate a sequence of symbol decisions therefrom utilizing the updated channel estimate and a decoder adapted to receive the symbol decisions and to generate output data therefrom.

There is also provided in accordance with the present invention a computer readable storage medium having a computer program embodied thereon for causing a suitably programmed system to track a fading mobile radio channel by performing the following steps when such program is executed on the system dividing a sequence of input samples into a plurality of blocks; for each block, calculating a correlation matrix on a sample block, factoring the correlation matrix, calculating a channel estimate correction factor as a function of the results of the factored correlation matrix, the sample block, data decisions and a previous channel estimate and generating an updated channel estimate as a function of the previous channel estimate and the channel estimate correction factor.

BRIEF DESCRIPTION OF THE DRAWINGS

The invention is herein described, by way of example only, with reference to the accompanying drawings, wherein.

DETAILED DESCRIPTION OF THE INVENTION

Figure 1:
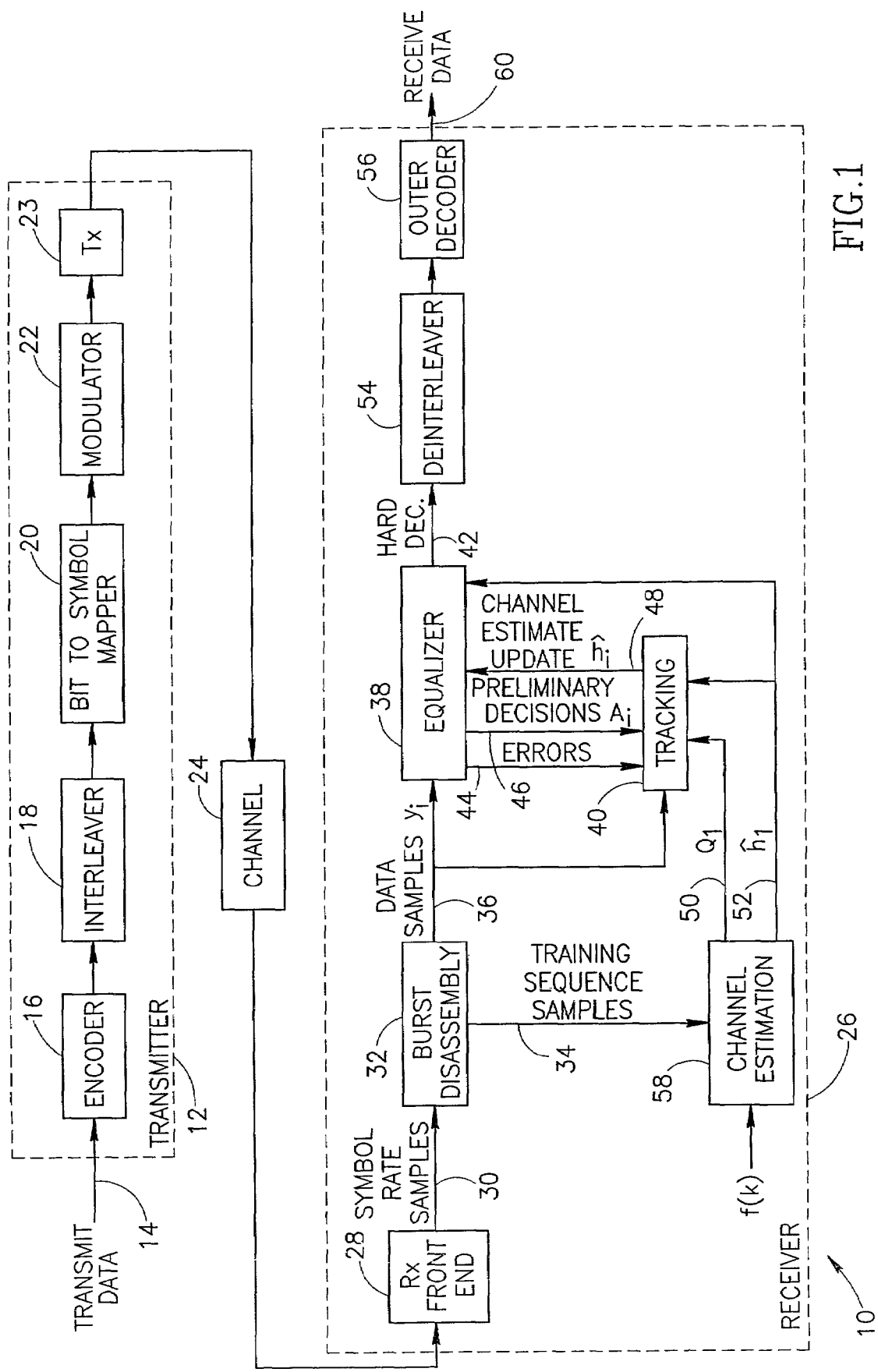
FIG. 1 is a diagram illustrating a communication system employing an inner and outer encoder in the transmitter, inner and outer decoding stages in the receiver and a channel tracking module constructed in accordance with the present invention.

Notation Used Throughout
The following notation is used throughout this document.

| Term | Definition |
| --- | --- |
| AMPS | Advanced Mobile Telephone System |
| ASIC | Application Specific Integrated Circuit |
| AWGN | Additive White Gaussian Noise |
| BER | Bit Error Rate |
| CDMA | Code Division Multiple Access |
| CPU | Central Processing Unit |
| CRC | Cyclic Redundancy Check |
| DFE | Decision Feedback Equalizer |
| DSL | Digital Subscriber Line |
| DSP | Digital Signal Processor |
| EDGE | Enhanced Data rates for GSM and TDMA/136 Evolution |
| EEPROM | Electrically Erasable Programmable Read Only Memory |
| EGPRS | Enhanced General Packet Radio System |
| EPROM | Erasable Programmable Read Only Memory |
| FIR | Finite Impulse Response |
| FPGA | Field Programmable Gate Array |
| GERAN | GSM EDGE Radio Access Network |
| GSM | Global System for Mobile Communication |
| IEEE | Institute of Electrical and Electronic Engineers |
| ISDN | Integrated Services Digital Network |
| ISI | Intersymbol Interference |
| LMS | Least Mean Squares |
| MAP | Maximum A Posteriori |
| MLSE | Maximum Likelihood Sequence Estimation |
| MSE | Mean Square Error |
| PSK | Phase Shift Keying |
| RF | Radio Frequency |
| RLS | Recursive Least Squares |
| ROM | Read Only Memory |
| RSSE | Reduced State Sequence Estimation |
| SNR | Signal to Noise Ratio |
| TACS | Total Access Communications Systems |
| TDMA | Time Division Multiple Access |
| VA | Viterbi Algorithm |
| WLAN | Wireless Local Area Network |
| WLL | Wireless Local Loop |

DETAILED DESCRIPTION OF THE INVENTION

The present invention is a novel and useful channel tracking mechanism that overcomes the disadvantages of the prior art. The channel tracking mechanism is operative to generate updated channel estimates on blocks of samples during reception of a burst. The channel estimate updates can then be used to improve the performance of the equalizer. The present invention is suitable for use with a wide range of communication systems and is particularly useful in communication systems where the channel is a frequency selective, time dispersive, fading mobile radio channel.

To aid in understanding the principles of the present invention, the method is described in the context of a channel tracking module in a wireless modem intended for use in a GSM or GERAN cellular system. As described in more detail below, the channel tracking module is adapted to calculate channel estimate updates on blocks of samples using a method based on recursive least squares (RLS) wherein the method utilizes the well known Cholesky decomposition technique in solving the recursive RLS equations.

Note that the modem configuration presented herein is intended for illustration purposes only and is not meant to limit the scope of the present invention. It is appreciated that one skilled in the communication signal processing arts can apply the channel tracking method of the present invention to numerous other modem topologies and communication scenarios as well.

A diagram illustrating a communication system employing an inner and outer encoder in the transmitter, inner and outer decoding stages in the receiver and a channel tracking module constructed in accordance with the present invention is shown in FIG. 1. The communication system, generally referenced 10, comprises a concatenated encoder transmitter 12 coupled to a channel 24, and a concatenated decoder receiver 26. The transmitter comprises an encoder 16, interleaver 18, bit to symbol mapper 20, modulator 22 and transmitter circuit 23.

Input data bits 14 to be transmitted are input to the encoder which may comprise an error correction encoder such as Reed Solomon, convolutional encoder, parity bit generator, etc. The encoder functions to add redundancy bits to enable errors in transmission to be located and corrected.

The bits output of the encoder are then input to the interleaver which functions to rearrange the order of the bits in order to more effectively combat error bursts in the channel. The bits output of the interleaver are then mapped to symbols by the symbol mapper. The bit to symbol mapper functions to transform bits to modulator symbols from an M-ary alphabet. For example, an 8-PSK modulator converts input bits into one of eight symbols. Thus, the mapper in this case generates a symbol for every three input bits.

The symbols output from the mapper are input to the modulator which functions to receive symbols in the M-ary alphabet and to generate an analog signal therefrom. The transmit circuit filters and amplifies this signal before transmitting it over the channel. The transmit circuit comprises coupling circuitry required to optimally interface the signal to the channel medium.

The channel may comprise a mobile wireless channel, e.g., cellular, cordless, fixed wireless channel, e.g., satellite, or may comprise a wired channel, e.g., xDSL, ISDN, Ethernet, etc. It is assumed that AWGN is present which is added to the signal in the channel. The transmitter is adapted to generate a signal that can be transmitted over the channel so as to provide robust, error free detection by the receiver.

It is noted that both the inner and outer decoders in the receiver have complimentary encoders in the system. The outer encoder in the system comprises the encoder 16, e.g., convolutional, etc. The inner encoder comprises the channel itself, which in one embodiment can be modeled as an L-symbol long FIR-type channel.

At the receiver, the analog signal from the channel is input to Rx front end circuitry 28 which demodulates and samples the received signal to generate received samples 30 at the symbol rate. Assuming a receiver adapted to receive a GSM signal, the samples are then input to a burst disassembly module 32. The samples comprising a complete burst are collected and subsequently split into training sequence samples 34 and data samples $y_i$ 36. The data samples $y_i$ are input to the equalizer 38 and the tracking module 40. The training sequence samples are input to a channel estimation block 58 which functions to calculate the initial channel estimate $\hat{h}_1$ 52. The initial channel estimate is generated using the received training sequence samples and the known training sequence f(k).

Several methods of channel estimation that are known in the art and suitable for use with the present invention include, for example, a correlation method and a least squares method. The correlation method is described in detail in "GSM System Engineering," A. Mehrotra, 1997, Chapter 6 and in the article "On the Minimization of Overhead in Channel Impulse response Measurement," Y. Han, IEEE Transactions on Vehicular Technology, Vol. 47, No. 2, May 1998, pages 631–636. The least squares method of channel estimation is described in more detail in the articles "Improved Channel Estimation With Side Information," A. S. Khayrallah, R. Ramesh, G. E. Bottomley, D. Koilpillai, IEEE, March 1997, pages 1049–1051 and "Impact of Blind versus Non-Blind Channel Estimation on the BER Performance of GSM Receivers," D. Boss, T. Petermann, K. Kammeyer, IEEE Signal Processing Workshop on Higher-Order Statistics, Jul. 21, 1997, pages 62–67 and in the book "Adaptive Filter Theory," S. Haykin, 1996, Chapter 11 (Method of Least Squares).

Another channel estimation technique suitable for use with the present invention is described in U.S. Pat. No. 6,907,092, to Yakhnich et al, entitled "Method of Channel Order Selection and Channel Order Estimation in a Wireless Communication System," similarly assigned and incorporated herein by reference in its entirety.

The inner decoder (i.e. the equalizer) is operative to generate decisions 42 from the data samples $y_i$. An example of an inner decoder is an equalizer which compensates for the ISI caused by the delay and time spreading of the channel. The function of the equalizer is to attempt to detect the symbols that were originally transmitted by the modulator. The equalizer is adapted to output symbol decisions and may comprise, for example the well known maximum likelihood sequence estimation (MLSE) based equalizer that utilizes the well known Viterbi Algorithm (VA), linear equalizer or decision feedback equalizer (DFE).

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM and GERAN systems.

The MLSE technique is a nonlinear equalization technique which is applicable when the radio channel can be modeled as a Finite Impulse Response (FIR) system. Such a FIR system requires knowledge of the channel impulse response tap values. As described supra, the channel estimate is obtained using a known training symbol sequence to estimate the channel impulse response. Other equalization techniques such as DFE or linear equalization require precise knowledge of the channel.

The initial channel estimate 52 $\hat{h}_1$ is used by both the equalizer and the tracking module. The equalizer uses the initial channel estimate in processing the first data blocks on either side of the training sequence midamble. The tracking module uses the initial channel estimate in computing the recursive equations for the channel estimate updates. The channel estimation block is also operative to generate the initial correlation matrix $Q_1$ 50 that is used by the tracking module in the recursive computations for the updated channel estimates.

The equalizer is operative to use the initial channel estimate in generating hard decisions 42 for the first block of data samples. Decisions for subsequent data blocks are generated using the updated channel estimates $\hat{h}_i$ 48 provided by the tracking module. The equalizer is also operative to generate preliminary decisions $A_i$ 46 which are used by the tracking module in computing the recursive equations for the updated channel estimate.

In computing the updated channel estimates, the tracking module generates an error quantity. This error quantity either can be computed directly by the tracking module or can be provided by the equalizer. In the latter case, the error information 44 is provided by the equalizer to the tracking module. In the former case, the equalizer does not need to provide the error information since the tracking module computes the error quantity directly from the data samples.

The output of the equalizer are input to a deinterleaver 54 which is operative to reconstruct the original order of the data input to the transmitter. The deinterleaved values are subsequently input to the outer decoder 56.

The outer decoder functions to detect and correct errors using the redundancy bits inserted by the encoder in the transmitter and to generate the receive data 60. Examples of the outer decoder include convolutional decoders utilizing the Viterbi Algorithm, etc.

Channel Tracking Module

The channel tracking mechanism of the present invention will now be described in more detail. The channel tracking mechanism is based on the well known recursive least squares (RLS) technique. Details of the RLS algorithm can be found in Chapter 13 (Recursive Least Squares Algorithm) of the book "Adaptive Filter Theory," S. Haykin, 1996.

The prior art RLS algorithm has the benefit of good tracking and convergence properties. Numerical problems arise, however, due to the use of the matrix inversion lemma. In addition, the prior art RLS algorithm functions to update channel information every sample time thus preventing the use of precalculated tables in the equalizer which causes a significant increase in equalizer complexity.

The numerical problems associated with the prior art are avoided by the use of the well known matrix factoring technique known as Cholesky decomposition. It is used in the block RLS method of the present invention rather than the matrix inversion lemma due to the low computational complexity and good numerical stability of the Cholesky decomposition.

In order to prevent the significant increase in equalizer complexity normally associated with sample by sample updating, the channel information is updated on a block by block basis rather than on a sample by sample basis. Thus, in accordance with the present invention, the channel information is updated once per block. Preferably, the block length is chosen short enough to enable good tracking performance while sufficiently long enough to minimize the overhead of equalizer table updates. The savings in computations is illustrated considering a channel of length 7, which is modeled as a seven tap FIR filter, and an 8-PSK signal having eight possible symbols. The 56 product results of the multiplication of the 8 possible symbols with the 7 channel taps are stored in a table that is used by the Viterbi equalizer in computing the branch metrics for the trellis. Rather than compute the table every sample time, with the present invention, the table is re-computed once per block.

It is noted that another problem with the prior art matrix inversion lemma is that it is limited for use in cases where the block length is less than the channel length. In the case of a GSM burst, the typical block length used is 10 to 20 samples long. The channel length, however, is on the order of 5 to 7, thus precluding the use of the matrix inversion lemma.

The RLS method used in the tracking mechanism of the present invention is based on the weighted least squares approach to the estimation process and recursively updates parameters upon the arrival of new data. The weighted least squares approach to the estimation problem is based on the minimization of a weighted least squares criterion. The criterion or cost function to be minimized comprises the difference between a desired response (i.e. the received samples) and the output (i.e. the convolution of the decisions generated by the equalizer and the channel estimate).

The weighted least squares technique assumes a linear model which can be formulated in matrix form. Let us define the following, where the notation $\underline{x}$ indicates a vector x:
- $\underline{y}$ represents the input data sample vector;
- $\underline{h}$ is a vector representing the actual channel;
- A is the model matrix of data symbols;
- $\underline{n}$ represents the measured noise vector;

The equation for the input samples is as follows $$\underline{y} = A \cdot \underline{h} + \underline{n} \quad (1)$$

where
$\underline{y} = [y(0), \ldots, y(N-1)]^T$
$\underline{h} = [h(0), \ldots, h(L-1)]^T, L<N$
$\underline{n} = [n(0), \ldots, n(N-1)]^T$
L represents the channel length;
N represents the number of samples;

and the N by L matrix A is given as $$A = \begin{bmatrix} a(0) & a(-1) & \cdots & a(-L+1) \\ a(1) & a(0) & \cdots & a(-L+2) \\ \vdots & \vdots & \cdots & \vdots \\ a(N-2) & a(N-3) & \cdots & a(N-L-1) \\ a(N-1) & a(N-2) & \cdots & a(N-L) \end{bmatrix}_{N \times L} \quad (2)$$

The vector $A \cdot \underline{h}$ represents the convolution of data symbols a(k) with the channel $\underline{h}$.

Given the model and the channel, the input samples may be reconstructed as follows $$\hat{\underline{y}} = A\underline{h} \quad (3)$$

where $\hat{\underline{y}}$ represents the reconstructed input samples (i.e. input sample estimates) and $\underline{h}$ represents the channel. The cost function $C(\underline{h})$ to be used in the RLS algorithm is formulated from the difference between the received samples and the estimated samples as follows $$C(\underline{h}) = (\underline{y} - \hat{\underline{y}})^H W (\underline{y} - \hat{\underline{y}}) \quad (4)$$
$$= (\underline{y} - A\underline{h})^H W (\underline{y} - A\underline{h})$$

where the channel estimate $\underline{\hat{h}}$ is found by minimization of the cost function with respect to $\underline{h}$ and W represents a weighting function. Using vector derivatives, the solution of Equation 4 is as follows $$\underline{\hat{h}} = (A^H W A)^{-1} A^H W \underline{y} \quad (5)$$

Note that Equation 5 assumes that the entire data sequence is known.

When W is a diagonal exponential weighting matrix, a sample by sample recursive solution is provided by the well known RLS algorithm. A recursive solution, however, may be formulated more generally for any block-diagonal weighting matrix of the form $$W = \begin{bmatrix} W_1 & & & 0 \\ & W_2 & & \\ & & \ddots & \vdots \\ 0 & & \cdots & W_M \end{bmatrix} \quad (6)$$

where $W_i$ is a K×K matrix such that $$K \cdot M = N \quad (7)$$

where
- K is the length of each block;
- M is the number of blocks;
- N is the number of total samples;

Therefore, the input data samples and the model matrix may be divided into a plurality of blocks as follows $$A = \begin{bmatrix} A_1 \\ \vdots \\ A_M \end{bmatrix} \quad (8)$$

The A matrix is thus divided into M blocks each having dimensions K×L.

$$\underline{y} = \begin{bmatrix} \underline{y}_1 \\ \vdots \\ \underline{y}_M \end{bmatrix} \quad (9)$$

Similarly, the input sample vector $\underline{y}$ is also divided into M blocks of N samples in each block. The cost function C can then be rewritten in terms of blocks as follows $$C = \sum_{i=1}^{M} (\underline{y}_i - A_i \underline{h})^H W_i (\underline{y}_i - A_i \underline{h}) \quad (10)$$

The recursive solution to Equation 10 is as follows
For initialization:

$$Q_1 = A_1^H W_1 A_1 \quad (11)$$

$$\underline{\hat{h}}_1 = Q_1^{-1} * A_1^H W_1 \underline{y}_1 \quad (12)$$

For updating:

$$Q_i = Q_{i-1} + A_i^H W_i A_i \quad (13)$$

$$\underline{\hat{h}}_i = \underline{\hat{h}}_{i-1} + Q_i^{-1} * A_i^H W_i (\underline{y}_i - A_i \underline{\hat{h}}_{i-1}) \quad (14)$$

Note that the classic RLS recursion is arrived at results for data blocks of length one (i.e. a tap length of one) and exponential weighting. In the case of a GSM burst, Equations 11 and 12 are calculated using the samples from the training sequence. Depending on the implementation, the initial channel estimate $\hat{h}_1$ can either be generated by the channel estimation block 58 (FIG. 1) or by the tracking module. In the latter case, the training sequence samples 34 are input to the tracking module and Equation 12 used to generate the initial channel estimate $\hat{h}_1$.

In accordance with the invention, $W_i$ is chosen to be $I\alpha^{i-1}$ where $\alpha > 1$ and $I$ represents the unit matrix. This definition for $W_i$ results in an exponentially increasing interblock weighting. Such a weighting provides better tracking by emphasizing data that is newer in time. Therefore, Equations 13 and 14 can be rewritten as follows $$Q_i = Q_{i-1} + \alpha^{i-1} A_i^H A_i \tag{15}$$

$$\hat{h}_i = \hat{h}_{i-1} + \alpha^{i-1} Q_i^{-1} A_i^H (\underline{y}_i - A_i \hat{h}_{i-1}) \tag{16}$$

Let us define the weighted version of Q as $\tilde{Q}_k = Q_k \lambda^{k-1}$ where $\lambda = 1/\alpha$, $\lambda < 1$. Dividing both sides of Equation 15 by $\alpha^{i-1}$ and rewriting Equation 15 in terms of $\tilde{Q}_{(k)}$ yields the following $$\begin{aligned}\tilde{Q}_1 &= \frac{Q_i}{\alpha^{i-1}} \\ &= \frac{Q_{i-1}}{\alpha^{i-1}} + A_i^H A_i \\ &= \tilde{Q}_{i-1} \frac{1}{\alpha} + A_i^H A_i \\ &= \lambda \tilde{Q}_{i-1} + A_i^H A_i\end{aligned} \tag{17}$$

It is noted that $$\tilde{Q}_k^{-1} = \frac{Q_k^{-1}}{\lambda^{k-1}} = \alpha^{i-1} Q_k^{-1}.$$

Hence, Equation 16 can be rewritten as follows $$\hat{h}_i = \hat{h}_{i-1} + \tilde{Q}_i^{-1} A_i^H (\underline{y}_i - A_i \hat{h}_{i-1}) \tag{18}$$

Equations 17 and 18 are recursive iterations that are equivalent to Equations 13 and 14 for a particular weighting. Now, however, the weighting is in the form of a forgetting factor as shown in Equation 17.

Cholesky Decomposition of Matrix Q

As can be seen from Equations 12 and 14 the matrix $Q_i$ must be inverted in computing the block RLS recursion equations. Traditionally, the matrix inversion lemma is used in the RLS algorithm to calculate the inversion of the Q matrix. As described hereinabove, the matrix inversion lemma is not desirable and cannot be used in cases where the block size N is bigger than the length of the parameter vector, which in this case is the length L of the channel model. In accordance with the present invention, the inversion of the matrix Q is calculated using the well known Cholesky factorization or decomposition.

As can be easily seen, for W=I, matrix Q is the correlation matrix of the data. From Equations 11 and 13 the Q matrix is conjugate symmetric meaning the matrix is equal to its Hermetian. Therefore $$Q = LL^H \tag{19}$$

where L is a lower triangular matrix that is found using Cholesky decomposition. The Cholesky decomposition algorithm functions to construct a lower triangular matrix L whose conjugate transpose $L^H$ can itself serve as the upper triangular part. The complexity of the process comprises $N^3/6$ executions of a loop comprising a multiplication and a subtraction, where N is the dimension of matrix Q which is equivalent to the channel length L.

The expression for the updated channel estimate in Equation 14 can be considered the sum of the previous channel estimate and a correction factor. The correction factor $\underline{x}$ can be expressed as a set of linear equations of the form $$\underline{x} = Q^{-1} \underline{b} \tag{20}$$

where $\underline{b}$ is equal to $A_i^H W_i (Y_i - A_i \hat{h}_{i-1})$. Thus, if the vector $\underline{x}$ can be found, there is no need to invert the Q matrix. In accordance with the invention, the vector $\underline{x}$ is found using Cholesky decomposition and using the results to solve a series of linear equations. Equation 20 is equivalent to the linear system of equations of the form $$Q\underline{x} = \underline{b} \tag{21}$$

Substituting Equation 19 yields $$LL^H \underline{x} = \underline{b} \tag{22}$$

Defining $$L^H \underline{x} = \underline{y} \tag{23}$$

The vector $\underline{x}$ can be found by first solving the following linear system of equations for $\underline{y}$ $$L\underline{y} = \underline{b} \tag{24}$$

and then using the results to solve the linear Equation 23. Note that solving both Equations 23 and 24 is a relatively easy task since L and $L^H$ are triangular matrices. Note that the solution of Equation 24 requires knowledge of the data decisions $A_i$, weighting function $W_i$, received samples $\underline{y}_i$ and the previous channel estimate $\hat{h}_{i-1}$.

As mentioned previously, the decisions of Viterbi type equalizers have large delay associated with them, which makes their use inappropriate for tracking. Several strategies can be used, however, to overcome this drawback. Examples of well known techniques that may be used include Per-Survival Processing and Minimum-Survivor (or Best-Survivor) Processing which are described in detail in "A Continuously Adaptive MLSE Receiver for Mobile Communications: Algorithm and Performance," G. Castellini, F. Conti, E. Del Re and L. Pierucci, IEEE Transactions on Communication, Vol. 45, No. 1, January 1997, pp. 80–89. Another approach, probably the most commonly used, is described in detail in "A Novel Adaptive Receiver with Enhanced Channel Tracking Capability for TDMA-Based Mobile Radio Communications," E. Baccarelli, R. Cusani and S. Galli, IEEE Journal on Selected Area in Communications, Vol. 16, No. 9, December 1998. According to this article, low depth traceback is performed in order to generate the decisions for tracking purposes. These kinds of decisions are termed preliminary or tentative decisions. Other hybrid approaches for decision generation for tracking are also possible. For example, see "Per-Survivor Processing and Tentative Decisions: What Is In Between?," R. Raheli, G. Marino and P. Castoldi, IEEE Transactions on Communications, Vol. 44, No. 2, February 1996.

Note that for purposes of the present invention, it is assumed that the preliminary decisions used by the tracking module are available. In accordance with the present invention, the preliminary decisions may be generated using any suitable well known technique including any of the techniques described above.

Since the tracking module performs calculations on a block basis, it cannot wait for the equalizer to process all the samples in the data portion of the burst, as is normally done. Normally, the Viterbi type equalizer is run for the entire burst and a traceback is performed after the end of the burst is reached (actually one half of the burst in the case of left and right data portions). Instead, the equalizer is run up to the length of a block and then stopped. A traceback is then performed on the block of samples. Note that better performance can be achieved if the equalizer is run for a block length of samples plus a number of samples in the next block equal to the channel length L, which is a decision delay. Running the equalizer process the extra number of samples improves the reliability of the decisions in the block that is being processed.

It is noted that in the prior art case of sample by sample channel estimate updating, a very short traceback of a few symbols (e.g., 2) must be used in order to generate data decisions for the recursion equations. Thus, a benefit of the block tracking of the present invention is the greatly increased reliability of the preliminary decisions generated. The reliability comes from generating a decision over a greater number of samples.

It is important to note that the generation of the preliminary decisions by the equalizer involves a compromise between the desire to use actual final decisions and the time delay due to traceback over the entire message. The use of preliminary decisions therefore is a compromise that provides a much reduced delay in exchange for reduced reliability of the decisions.

The block tracking method and apparatus of the present invention are not limited by the type of matrix inversion used or the particular method for the solution of a system of linear equations. It is appreciated that one skilled in the signal processing arts can apply other well known methods of matrix inversion and of solving systems of linear equations, other than Cholesky decomposition, to the channel tracking technique of the present invention without departing from the scope of the invention.

Figure 2:
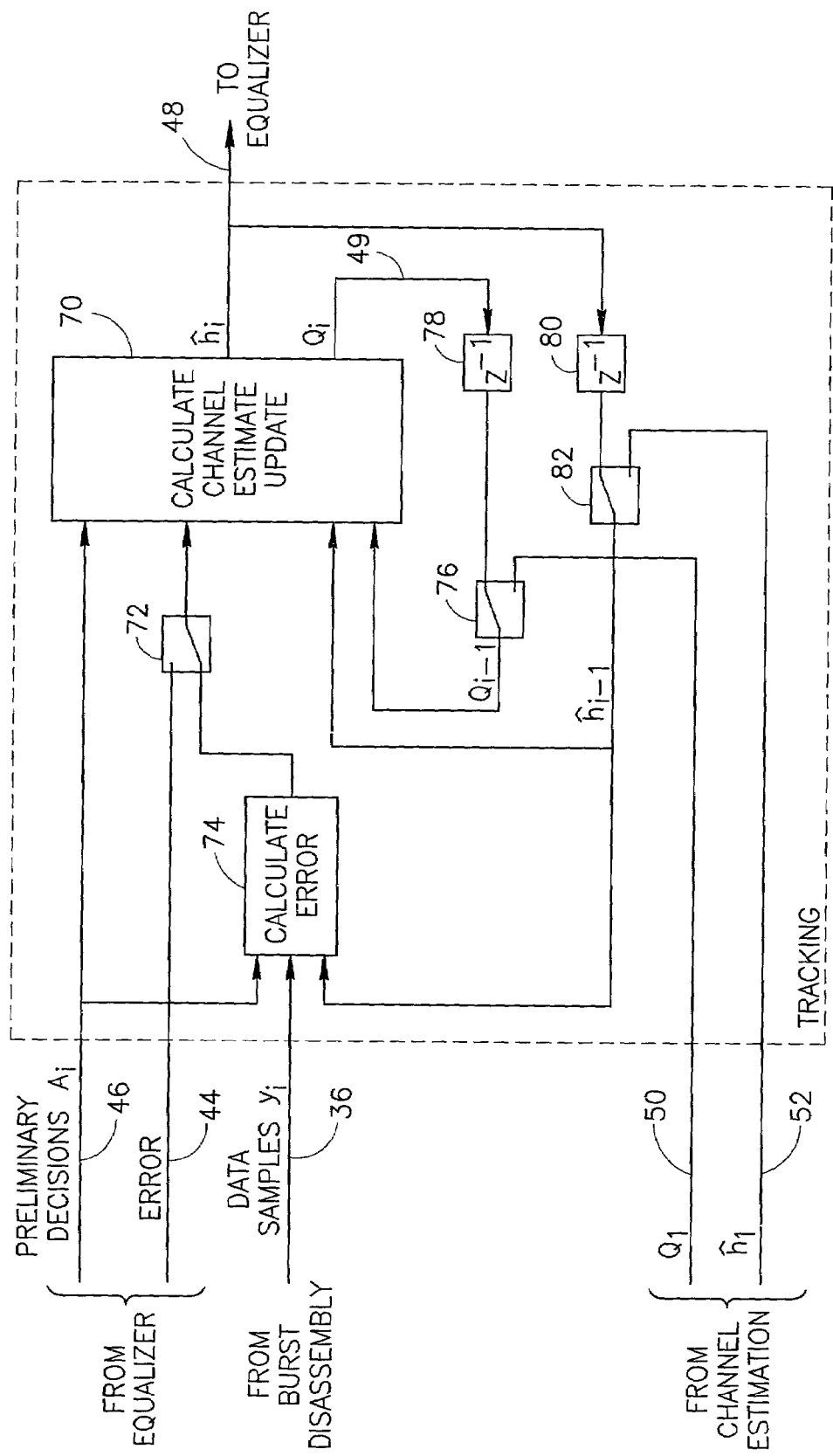
FIG. 2 is a block diagram illustrating the tracking module of FIG. 1 in more detail.

A block diagram illustrating an implementation of the tracking module of FIG. 1 in more detail is shown in FIG. 2. The tracking module 40, comprises several computational blocks including an error calculator 74 and a channel estimate update calculator 70. The module also comprises switches 72, 76, 82 and unit delays 78, 80.

In operation, the channel estimate update calculator comprises means for computing the recursive RLS equations in Equations 11, 12, 13 and 14. Alternatively, the initial state provided by Equations 11 and 12 can be calculated by another entity such as the channel estimation block 58 (FIG. 1). In this case, $Q_1$ 50 and $\hat{h}_1$ 52 are input to the update calculator 70 via appropriate control of switches 76, 82, respectively. For initialization only, the switches are configured to pass the initial values of $Q_1$ and $\hat{h}_1$ to the update calculator. Thereafter, the switches are configured to pass the output of the unit delays 78, 80 instead. The delays function to provide previous values of the correlation matrix and channel estimate to the update calculator.

As described supra, the error factor $y-A_i\hat{h}_{i-1}$ can be provided either directly by the equalizer or computed by the error calculator 74. Depending on the implementation, switch 72 is set appropriately. In the latter case, the preliminary decisions $A_i$, data samples $y_i$ and the previous channel estimate $\hat{h}_{i-1}$ are used in the calculation of the error. The preliminary decisions are also used by the update calculator in computing the updated correlation matrix and channel estimate. The updated channel estimate $\hat{h}_i$ 48 is output and used by the equalizer in processing the next block of data. It is also fed back to unit delay 80 for use in computing the next update. The updated correlation matrix $Q_i$ is fed back to the unit delay 78 for use in the next update calculation.

Figure 3:
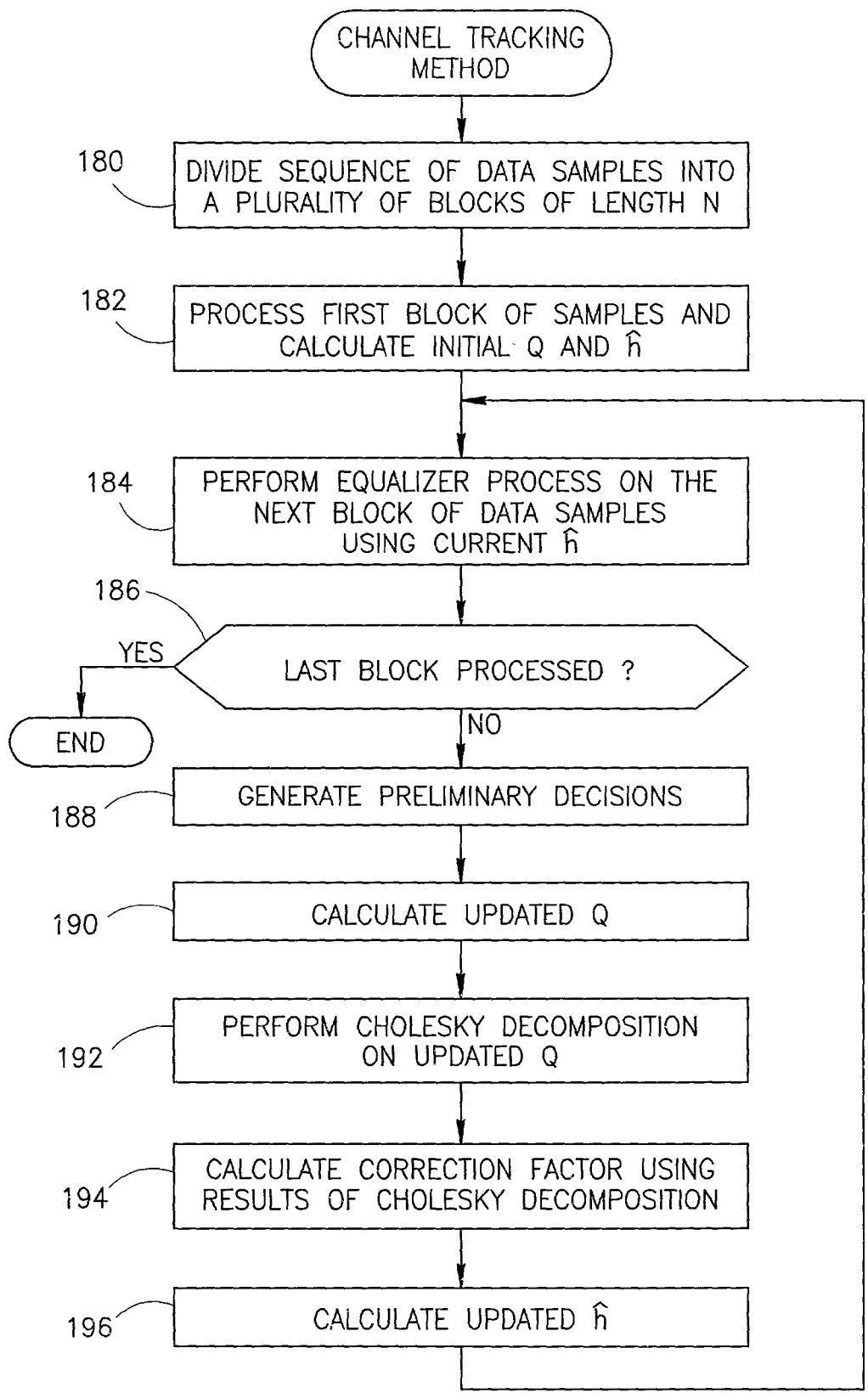
FIG. 3 is a flow diagram illustrating the channel tracking method of the present invention.

A flow diagram illustrating the channel tracking method of the present invention is shown in FIG. 3. In accordance with the invention, the data samples are divided into a plurality of blocks, each having a length N (step 180). The first block of samples is processed using Equations 11 and 12 and the initial values of the correlation matrix $Q_1$ and the channel estimate $\hat{h}_1$ are computed (step 182). Note that in the case of a GSM burst, the first block of samples comprises the training sequence samples.

The equalizer process is then performed on the next block of data samples using the latest channel estimate computed (step 184). If the last block has been processed by the equalizer (step 186) then the method terminates. If it is not the last block, the correlation matrix and channel estimate are updated using Equations 13 and 14. First, the preliminary decisions are generated, such as by performing a traceback as described above (step 188). The updated correlation matrix Q is then calculated (step 190). Cholesky decomposition is then performed on the updated Q matrix (step 192) and the correction factor $Q_i A_i^H W_i(y_i - A_i\hat{h}_{i-1})$ is computed (step 194). The correction factor is then used to compute the update for the channel estimate $\hat{h}_i$ (step 196).

Figure 5:
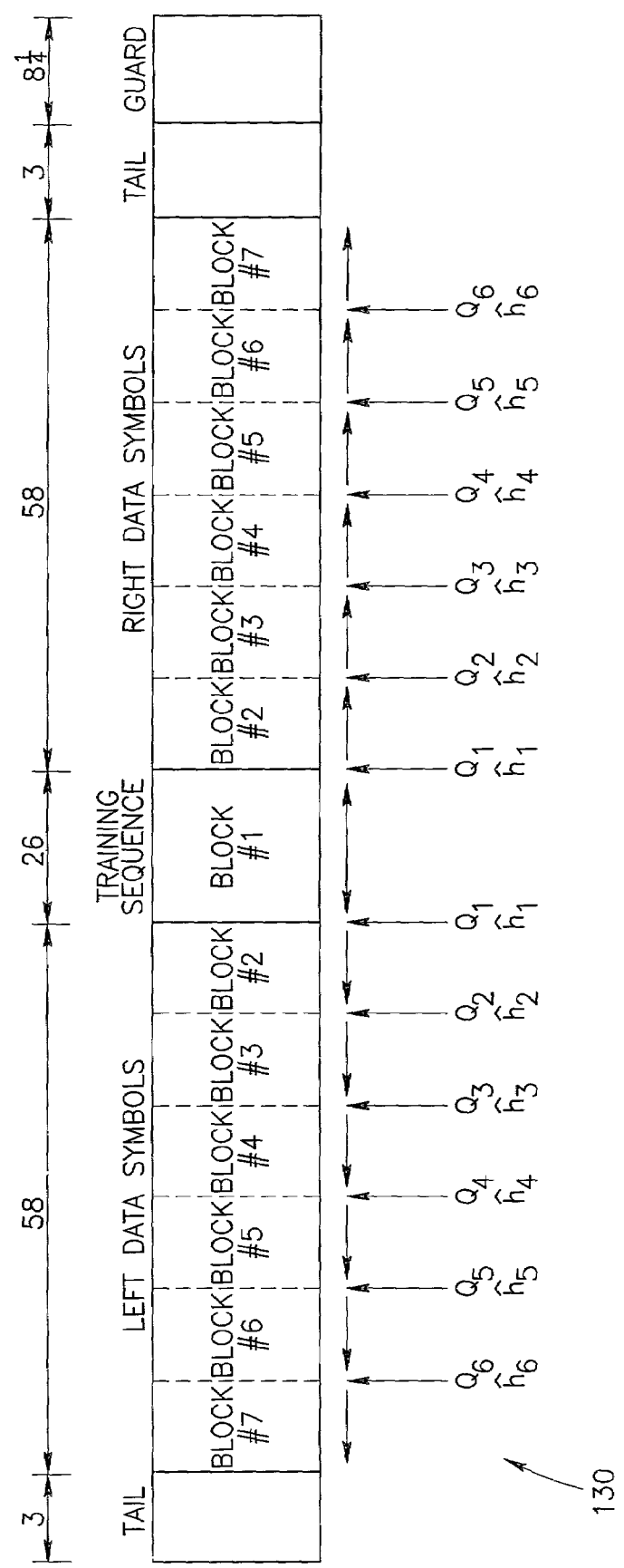
FIG. 5 is a diagram illustrating the elements of a GSM burst including tail, data and training symbols wherein the data is divided into a plurality of sample blocks.

With reference to FIG. 5, the direction of the block processing is illustrated for the case of a GSM burst. In a GSM burst, the data symbols are transmitted in left and right data portions. The midamble comprises the training sequence symbols. The burst disassembly extracts the training sequence samples and the data samples. The training sequence samples comprise the initial block of samples that is processed. Depending on the implementation, either the channel estimation block or the tracking module is operative to calculate the initial correlation matrix $Q_1$ using Equation 11 and the initial channel estimate $\hat{h}_1$ using Equation 12. The direction of the horizontal arrows indicate the direction of the equalizer processing. The vertical up arrow indicates the quantities that are computed for that block.

The processing of the left and right data portions then proceeds beginning with the left data portion. In this example, both left and right data portions are divided into 6 blocks each: 5 blocks of 10 samples and 1 block of 8 samples. Equalizer processing begins with Block #2 since the initial state at the rightmost sample time is known. The first block of data (i.e. Block #2) is processed by the equalizer and preliminary decisions are generated. The block of samples is then processed by the tracking module in the direction of the horizontal arrow. Updating Equations 13 and 14 are used to compute updated $Q_2$ and $\hat{h}_2$ which are used in the tracking processing of Block #3. The samples in Block #3 are used to generate the next updates of the correlation matrix and channel estimate, $Q_3$ and $\hat{h}_3$. The process continues to the end of the left data portion. Note that the samples of Block #6 are used to compute updates $Q_6$ and $\hat{h}_6$ which are used by the equalizer in processing the 8 samples in Block #7. No updates to the correlation matrix or channel estimate are computed for Block #7, however, since there are no additional sample blocks to be processed by the equalizer.

The processing of the right data portion proceeds in the same fashion as for the left data portion. Equalizer processing begins with Block #2 since the initial state is already known at this point. The previous updates for the correlation matrix and channel estimate, $Q_6$ and $\hat{h}_6$ (calculated during the processing of left data symbols) are discarded and the initial values $Q_1$ and $\hat{h}_1$ are calculated and used in the tracking processing of Block #2. The samples in Block #2 are used to compute the updated quantities $Q_2$ and $\hat{h}_2$. The process continues as described above with the last update being computed on the samples in Block #6. Updated quantities are not computed on the 8 samples of Block #7 since this is the last sample block processed by the equalizer.

The recursive update computations have two key parameters: block length and weighting. The block length K can be set to any desired value depending on the particular implementation. In the case of a GSM burst, however, it has been found by simulation that a block length of 20 yields near optimum performance. The following analysis shows such a length is reasonable. The mean square error (MSE) of a Rayleigh tap (i.e. a one tap channel) corresponding to the average energy of the difference, which is the noise due to non tracking of the channel, is as follows $$\{[h(t)-h(t+20T)]^2\}=2 \cdot R(0)-2 \cdot R(20T) \quad (25)$$

where

R is autocorrelation function of the tap;

h is the Rayleigh tap;

T is a symbol period;

The Rayleigh tap is modeled as amplitude of a complex, 300 Hz wide Gaussian process. For a block length of 20, this results in an error energy of approximately 0.7% of the tap power. If the percentage is considered noise, this corresponds to an SNR of over 21 dB. For comparison, a tap changing over a entire half burst (i.e. block length of 58) results in an error energy of approximately 6%. This corresponds to an SNR of 12 dB which makes the 'noise' due to the error in the channel estimate intolerable.

In connection with the weighting parameter, the prior art RLS algorithm uses an exponential forgetting weighting sample by sample to enable tracking of time varying parameters. Applied to the present invention, this corresponds to applying the exponential weighting to sample by sample within a block. It is not desirable to use exponential weighting within a sample block for the following reasons:

1. As was shown above in connection with the selection of the block length parameter, the channel does not change significantly during the block. Therefore weighting within the block has minimal benefits.
2. Applying exponential weighting within a block significantly increases the complexity of the correlation matrix update computation.
3. The first decisions in a block have a smaller error probability (i.e. greater reliability) due to their resulting from a longer traceback.

Therefore, the tracking mechanism of the present invention does not apply weighting to the samples within a block. Instead, the weighting factor is applied between blocks (i.e. interblocks), as defined above by Equations 17 and 18. As a result of simulations, it has been found that an interblock forgetting factor of 0.6676 yields good performance. This factor was chosen empirically such that changes in the channel are tracked well enough while estimation noise is kept low. In other words, the forgetting factor was chosen to provide adequate tracking on the one hand, while including enough of the previous estimates to provide a sufficient average of the noise.

Note that if the same weighting is applied to all the blocks, the estimate will be averaged over the entire burst and changes in the channel will not be tracked well. Since the channel is changing, however, it is not desirable to have the current channel estimate influenced to such an extent by the previous estimates. On the other hand, if there was no noise, then no history is needed. Because noise is present, however, we average over many past samples using a wide window.

In connection with computation efficiency, it is noted that the two most computationally expensive tasks are the Cholesky decomposition and the solution of the Q matrix update. The complexity of the correlation matrix update can be reduced using the following two observations. First, since the matrix is conjugate symmetric, only one triangular matrix need be calculated. Second, it is noted that the main diagonal of the correlation matrix is real and is incremented by the block length.

GSM EDGE Embodiment

Figure 4:
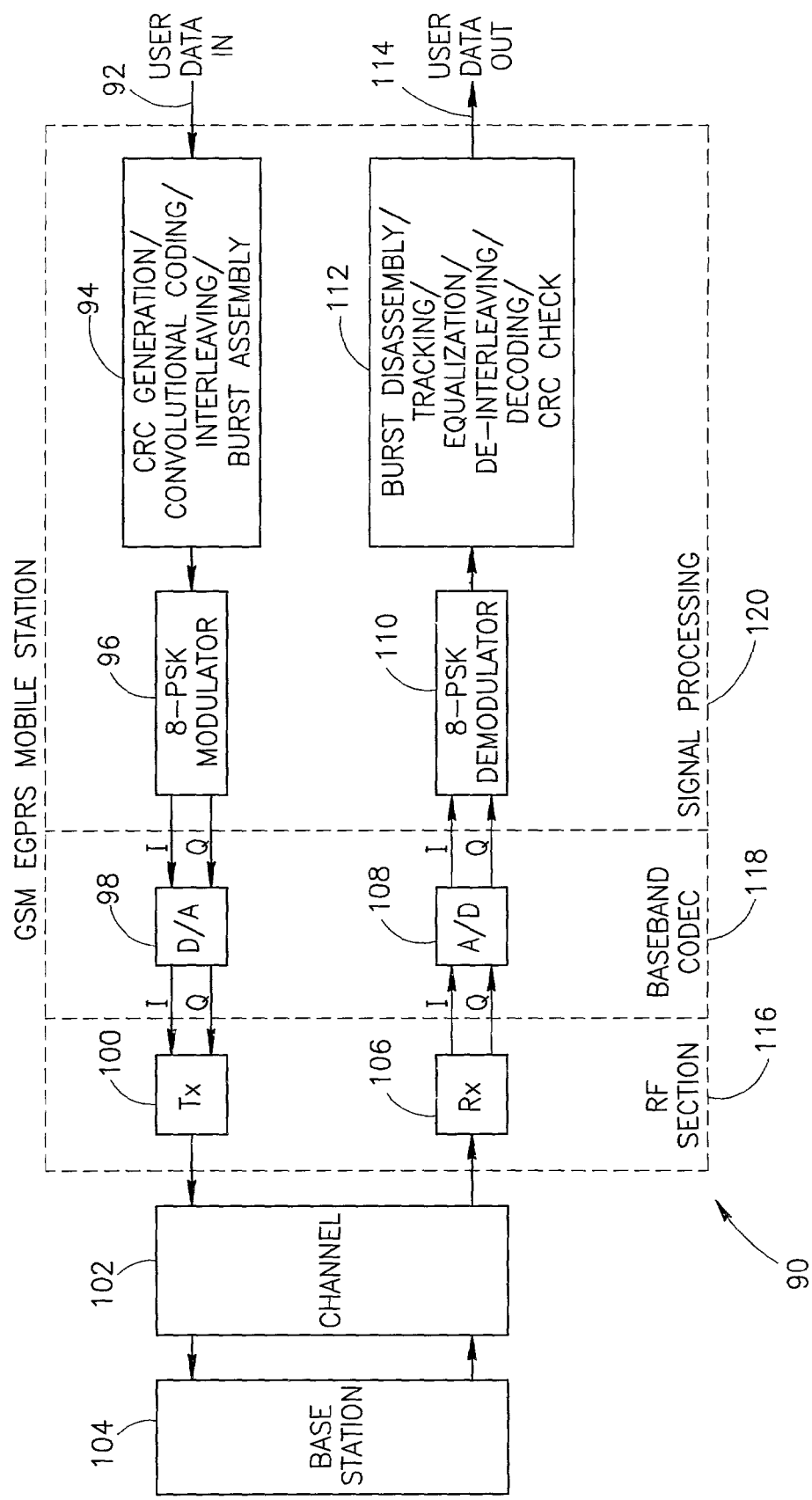
FIG. 4 is a block diagram illustrating the functional processing blocks in a GSM EGPRS mobile station.

A GSM EGPRS mobile station constructed to comprise means for performing the channel tracking method of the present invention is presented. A block diagram illustrating the functional processing blocks of a GSM EGPRS mobile radio station is shown in FIG. 4. The radio station is designed to provide reliable data communications at rates of up to 470 kbit/s. The GSM EGPRS mobile station, generally referenced 90, comprises a transmitter and receiver divided into the following sections: signal processing circuitry 120, baseband codec 118 and RF circuitry section 116.

In the transmit direction, the signal processing portion functions to protect the data so as to provide reliable communications from the transmitter to the base station 104 over the channel 102. Several processes performed by the channel coding block 94 are used to protect the user data 92 including cyclic redundancy code (CRC) check, convolutional coding, interleaving and burst assembly. The resultant data is assembled into bursts whereby guard and trail symbols are added in addition to a training sequence midamble that is added to the middle of the burst. Note that both the user data and the signaling information go through similar processing. The assembled burst is then modulated by a modulator 96 which may be implemented as a $3\pi/8$ offset 8-PSK modulator.

In the receive direction, the output of the baseband codec is demodulated using a complementary 8-PSK demodulator 110. Several processes performed by the channel decoding block 112 in the signal processing section are then applied to the demodulated output. The processes performed include burst disassembly, equalization, channel tracking in accordance with the present invention, de-interleaving, convolutional decoding and CRC check. Optionally, soft symbol generation and soft symbol to soft bit conversion may also be performed depending on the particular implementation.

The baseband codec converts the transmit and receive data into analog and digital signals, respectively, via D/A converter 98 and A/D converter 108. The transmit D/A converter provides analog baseband I and Q signals to the transmitter 100 in the RF circuitry section. The I and Q signals are used to modulate the carrier for transmission over the channel.

In the receive direction, the signal transmitted by the base station over the channel is received by the receiver circuitry 106. The analog signals I and Q output from the receiver are converted back into a digital data stream via the A/D converter. This I and Q digital data stream is filtered and demodulated by the 8-PSK demodulator before being input to the channel decoding block 112. Several processes performed by signal processing block are then applied to the demodulated output.

In addition, the mobile station performs other functions that may be considered higher level such as synchronization, frequency and time acquisition and tracking, monitoring, measurements of received signal strength and control of the radio. Other functions include handling the user interface, signaling between the mobile station and the network, the SIM interface, etc.

Simulation Results

To illustrate the benefits of the method of the present invention, a GSM Enhanced General Packet Radio System (EGPRS) was simulated and the results are presented herein. The simulation was performed assuming a GSM EGPRS transmitter and Typical Urban channel for a mobile unit moving at velocity of 50 km/h (TU50), with ideal frequency hopping employed.

The EGPRS system is a Time Division Multiple Access (TDMA) system wherein eight users are able to share the same carrier frequency. In an EGPRS transmitter, the data bits are encoded with a rate ⅓ punctured convolutional encoder, interleaved and mapped to 8-ary symbols. The resultant coded data symbols together with the training sequence are assembled into a burst of 142 symbols as shown in FIG. 5.

In GSM, the training sequence is sent in the middle of each burst. Each fixed length burst 130 consists of 142 symbols preceded by a 3 symbol tail and followed by a 3 symbol tail and 8.25 symbol guard. The 142 symbols include a 58 symbol data portion, 26 symbol training sequence and another 58 symbol data portion. Since the training sequence is sent in the middle of the burst, it is referred to as a midamble. It is inserted in the middle of the burst in order to minimize the maximum distance to a data bit thus minimizing the time varying effects at the ends of the burst.

The burst is then modulated using $3\pi/8$-offset 8-PSK with Gaussian pulse shaping in accordance with the GSM standard. The modulated output is transmitted over a frequency selective Gaussian channel. The receiver employs a Viterbi type equalizer with block tracking performed by the channel tracking mechanism of the present invention. The simulation assumptions are as follows: TU50 channel (Typical Urban channel incorporating Doppler effect of 50 km/h) with ideal frequency hopping, 900 MHz band, weighting using an interblock forgetting factor of 0.67 and AWGN interference.

Figure 6:
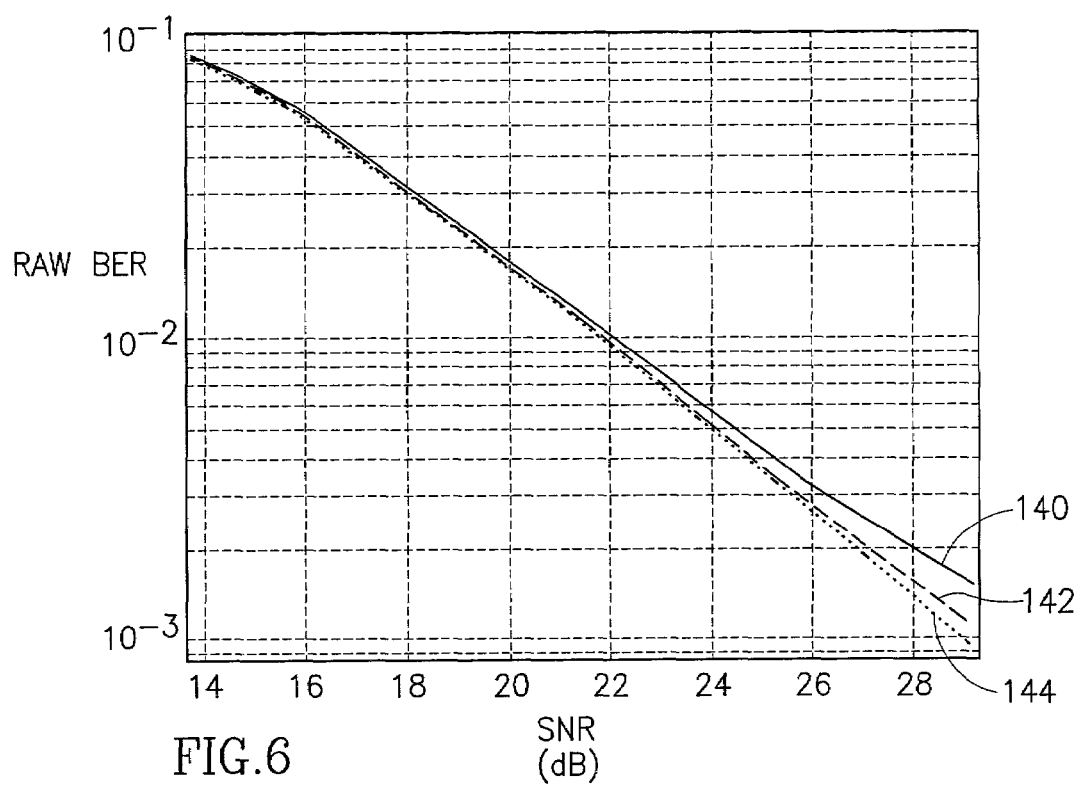
FIG. 6 is a graph illustrating simulation results showing raw BER versus SNR for a concatenated communications receiver constructed with and without the channel tracking mechanism of the present invention.
Figure 7:
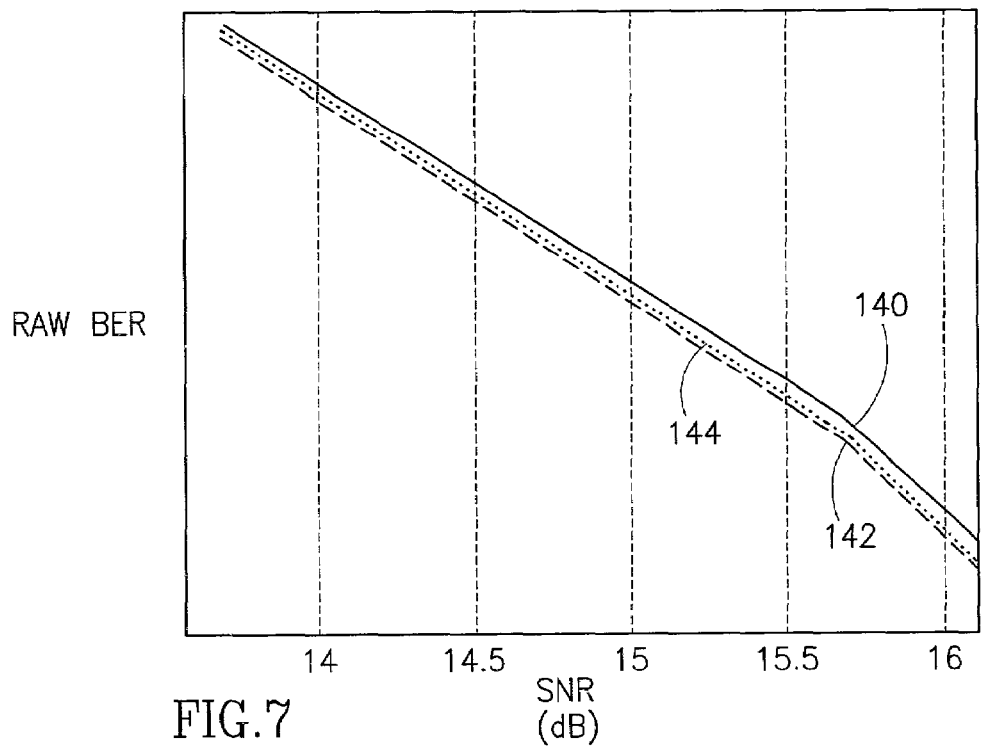
FIG. 7 is a graph illustrating an expanded view of the simulation results of FIG. 6.

Three different simulations were performed: a first with a block length of 10 samples, a second with a block length of 20 samples and a third with no tracking. FIG. 6 illustrates raw BER at the output of the equalizer versus SNR for a receiver without tracking, a receiver with tracking using a block length of 10 and a block length of 20. Expanded simulation results for low values of SNR are shown in FIG. 7. In both, the solid line 140 represents the simulation results for no tracking; the dotted line 142 represents the simulation results for tracking using a block length of 20 samples; and dashed line 144 represents the simulation results for tracking using a block length of 10 samples.

As can be seen, decreasing the block length below 20 samples leads to marginal improvements at high SNR while degrading equalizer performance at low SNR. Therefore, it is preferable to use longer block lengths. Another advantage of longer block lengths is that fewer channel estimate updates need to be performed with the consequent reduction in computation complexity. The situation worsens in terms of equalizer performance and computational complexity as the block length decreases with the worst case corresponding to a block length of 1 which is equivalent to sample by sample tracking.

Computer Embodiment

Figure 8:
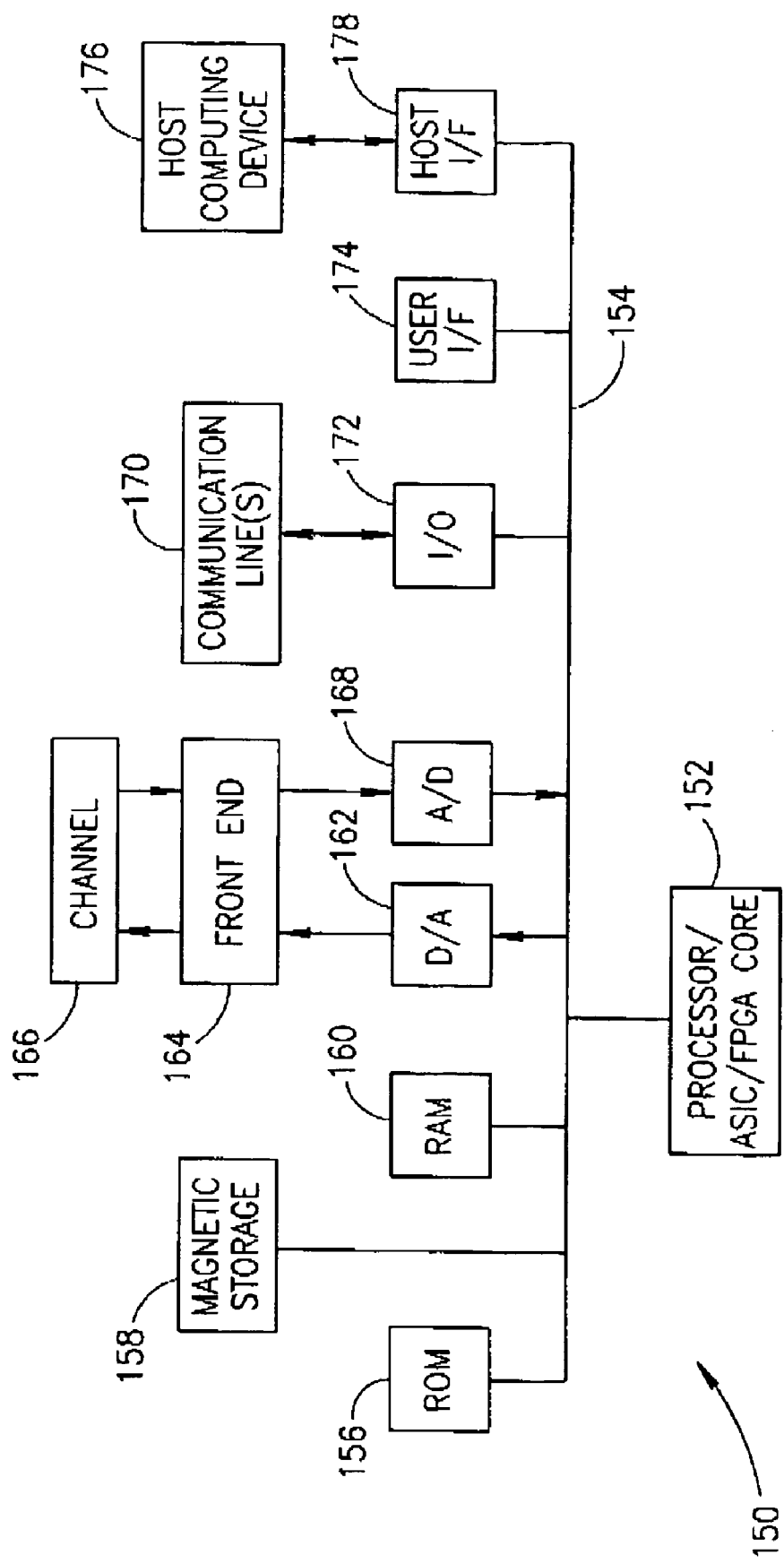
FIG. 8 is a block diagram illustrating an example computer processing system adapted to perform the channel tracking method of the present invention.

In another embodiment, a computer is operative to execute software adapted to perform the channel tracking method of the present invention. A block diagram illustrating an example computer processing system adapted to perform the channel tracking method of the present invention is shown in FIG. 8. The system may be incorporated within a communications device such as a receiver or transceiver, part of which is implemented in software.

The computer system, generally referenced 150, comprises a processor 152 which may be implemented as a microcontroller, microprocessor, microcomputer, ASIC core, central processing unit (CPU) or digital signal processor (DSP). The system further comprises read only memory 156 and dynamic main memory 160 all in communication with the processor. The processor is also in communication, via a bus 154, with a number of peripheral devices that are also included in the computer system.

A front end circuit 164 is used to transmit and receive over a channel 166. The front end circuit comprises RF circuitry, including receiver, transmitter and channel coupling circuitry. An A/D converter 168 functions to sample the baseband signal output of the front end circuit. The samples are then input to the processor where they are processed by a software modem. Samples generated by the software modem are sent over the bus from the processor to the D/A converter 162. The samples output of the D/A converter are input to the front end circuit for transmission over the channel.

One or more communication lines 170 are connected to the system via I/O interface 172. A user interface 174 responds to user inputs and provides feedback and other status information. A host interface 178 connects a host device 176 to the system. The host is adapted to configure, control and maintain the operation of the system. The system also comprises magnetic storage device 158 for storing application programs and data. The system comprises computer readable storage medium which may include any suitable memory means including but not limited to magnetic storage, optical storage, semiconductor volatile or non-volatile memory, biological memory devices, or any other memory storage device.

The software for performing the channel tracking method is adapted to reside on a computer readable medium, such as a magnetic disk within a disk drive unit. Alternatively, the computer readable medium may comprise a floppy disk, Flash memory card, ROM based memory (e.g., EEPROM, EPROM, etc.), bubble memory storage, any type of removable magnetic media (e.g., Zip, Jazz, Syquest, etc.), ROM storage, etc. The software adapted to perform the channel tracking method of the present invention may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of block based channel tracking, said method comprising the steps of:
    dividing a sequence of input samples into a plurality of sample blocks; for each sample block,
    calculating preliminary decisions by performing an equalizer function on at least an entire length of a current sample block and performing a traceback on an equalizer trellis generated therefrom;
    calculating an updated correlation matrix based on said current sample block;
    factoring said updated correlation matrix to yield a factored correlation matrix therefrom;
    calculating a channel estimate correction factor as a function of said factored correlation matrix, said current sample block, a previous channel estimate and said preliminary data decisions; and
    generating an updated channel estimate, for use with a next sample block, as a function of said previous channel estimate and said channel estimate correction factor.

2. The method according to claim 1, wherein said step of factoring comprises generating a lower triangle component of said correlation matrix.

3. The method according to claim 1, wherein said channel estimate correction factor is calculated using the equation $$Q_i^{-1} \cdot A_i^H W_i (\underline{y}_i - A_i \underline{h}_{i-1})$$

where Q represents said correlation matrix, A represents data decisions, W represents a weighting factor, y represents said sample block, i represents a block index and A·ĥ represents said estimated samples.

4. The method according to claim 1, wherein an error factor, equal to a difference between said input samples and estimated input samples, used in the step of calculating said channel estimate correction factor, is generated by an equalizer.

5. The method according to claim 1, wherein said data decisions are generated by running an equalizer over a length equal to a length of said current sample block plus a number of samples in a next sample block equal to the length of said channel, and subsequently performing a traceback thereon.

6. The method according to claim 1, further comprising the step of using said updated channel estimate during equalization processing of a subsequent block of input samples.

7. The method according to claim 1, further comprising a step of applying a weighting function to the calculation of said correlation matrix.

8. The method according to claim 7, wherein said weighting function is operative to emphasize more recent input sample blocks.

9. The method according to claim 7, wherein said weighting function is exponentially increasing between sample blocks.

10. The method according to claim 1, further comprising a step of applying a weighting function to the calculation of said channel estimate correction factor.

11. The method according to claim 10, wherein said weighting function is operative to emphasize more recent input sample blocks.

12. The method according to claim 10, wherein said weighting function is exponentially increasing between sample blocks.

13. The method according to claim 1, wherein an initial sample block comprises training sequence samples.

14. The method according to claim 1, wherein said updated channel estimate is calculated using the equation $$\underline{h}_i \underline{h}_{i-1} + Q_i^{-1} \cdot A_i^H W_i (\underline{y}_i - A_i \underline{h}_{i-1})$$

where Q represents said correlation matrix, A represents data decisions, W represents a weighting factor, y represents said sample block, i represents a block index $\underline{h}_{i-1}$ represents said previous channel estimate.

15. The method according to claim 1, wherein said step of factoring comprises steps of performing matrix inversion and solving a system of linear equations.

16. The method according to claim 1, wherein said step of factoring comprises factoring utilizing Cholesky decomposition.

17. The method according to claim 1, wherein the length of a sample block is longer than the length of said channel.

18. An apparatus for block based channel tracking, comprising:
    initialization means for initializing a correlation matrix in a tracking loop using an initial block of samples;
    an error generator operative to generate an error for a block of samples, said error comprising difference between received input samples and estimated input samples;
    a correction factor generator operative to generate a tracking loop correction factor as a function of a decomposition of said correlation matrix, said error, said estimated input samples and preliminary data decisions generated by performing a traceback on an equalizer trellis;
    an update mechanism operative to generate an updated channel estimate as a function of a previous channel estimate and said tracking loop correction factor.

19. The apparatus according to claim 18, wherein said initialization means is operative to initialize said correlation matrix using the equation $$Q_1 = A_i^H W_1 A_1$$

where $Q_1$ represents the initialized correlation matrix A represents training sequence samples and W represents a weighting function the subscript 1 represents an initial block.

20. The apparatus according to claim 18, wherein said initialization means is operative to initialize said channel estimate using the equation $$\underline{h}_1 = Q_1^{-1} \cdot A_1^H W_1 \underline{y}_1$$

where $Q_1$ represents said initialized correlation matrix, A represents training sequence samples, W represents a weighting function and y represents said received input samples the subscript 1 represents an initial block.

21. The apparatus according to claim 18, wherein an initial channel estimate is generated outside said tracking loop.

22. The apparatus according to claim 18, wherein said error is generated using the equation $$\underline{y}_i - A_i \hat{\underline{h}}_{i-1}$$

where y represents said received input samples, i represents a block index, A represents data decisions and $\hat{h}_{i-1}$ represents said previous channel estimate.

23. The apparatus according to claim 18, wherein said tracking loop correction factor is generated using the equation $$Q_i^{-1} \cdot A_i^H W_i (\underline{y}_i - A_i \hat{\underline{h}}_{i-1})$$

where Q represents said correlation matrix, A represents data decisions, W represents a weighting factor, y represents said received input samples, i represents a block index and A·ĥ represents said estimated samples.

24. The apparatus according to claim 18, wherein said data decisions are generated by running an equalizer over a length equal to a length of a current sample block plus a number of samples in a next sample block equal to a length of a channel, and subsequently performing a traceback thereon.

25. The apparatus according to claim 18, wherein said updated channel estimate is used during equalization processing of a subsequent block of input samples.

26. The apparatus according to claim 18, wherein said updated channel estimate comprises the sum of said previous channel estimate and said tracking loop correction factor.

27. The apparatus according to claim 18, wherein said initialization means is operative to apply a weighting function to the calculation of said correlation matrix.

28. The apparatus according to claim 27, wherein said weighting function is operative to emphasize more recent input sample blocks.

29. The apparatus according to claim 27, wherein said weighting function is exponentially increasing between sample blocks.

30. The apparatus according to claim 18, wherein said correction factor generator is operative to apply a weighting function to the calculation of said tracking loop correction factor.

31. The apparatus according to claim 30, wherein said weighting function emphasizes more recent input sample blocks.

32. The apparatus according to claim 30, wherein said weighting function exponentially increases between sample blocks.

33. The apparatus according to claim 18, wherein the initial sample block comprises training sequence samples.

34. The apparatus according to claim 18, wherein said correction factor generator is operative to generate said tracking loop correction factor by calculating a Cholesky decomposition of said correlation matrix.

35. The apparatus according to claim 18, wherein said correction factor generator is operative to generate said tracking loop correction factor by performing matrix inversion and solving a system of linear equations.

36. The apparatus according to claim 18, wherein the length of a sample block is longer than a length of a channel.

37. A communications receiver for receiving and decoding an M-ary transmitted signal, said communications receiver coupled to a fading mobile radio channel, comprising:

a radio frequency (RF) front end circuit for receiving and converting said M-ary transmitted signal to a baseband signal;

a demodulator operative to receive said baseband signal and to generate a received signal therefrom in accordance with a M-ary modulation scheme used to generate said transmitted signal;

a tracking module comprising processing means programmed to:
 divide a sequence of input data samples into a plurality of sample blocks;
 process a first sample block to calculate initial values for a correlation matrix and a channel estimate; for each subsequent sample block:
 perform equalizer processing on a next sample block using said channel estimate;
 update said correlation matrix and said channel estimate by generating preliminary data decisions on said next sample block by performing an equalizer function and a traceback of an equalizer trellis generated thereby, calculating an updated correlation matrix and a correction factor, and calculating an updated channel estimate as a function of said correction factor;

an equalizer operative to receive said received signal and to generate a sequence of symbol decisions therefrom utilizing said updated channel estimate; and a decoder operative to receive said symbol decisions and to generate output data therefrom.

38. The receiver according to claim 37, wherein said communications receiver is operative to receive and decode a Global System for Mobile Communication (GSM) signal.

39. The receiver according to claim 37, wherein said decoder comprises a convolutional decoder based on the Viterbi Algorithm (VA).

40. The receiver according to claim 37, wherein an M-ary symbol comprises an 8-PSK symbol.

41. The receiver according to claim 37, further comprising a de-interleaver whose output is subsequently input to said decoder.

42. The receiver according to claim 37, wherein said channel estimate correction factor is calculated using the equation $$Q_i^{-1} \cdot A_i^H W_i (\underline{y}_i - A_i \hat{\underline{h}}_{i-1})$$

where Q represents said correlation matrix, A represents data decisions, W represents a weighting factor, y represents said sample block, i represents a block index and A·ĥ represents said estimated samples.

43. The receiver according to claim 37, wherein said data decisions are generated by running said equalizer over a length equal to a length of a current sample block plus a number of samples in a next sample block equal to a length of of said channel, and subsequently performing a traceback thereon.

44. The receiver according to claim 37, wherein a weighting function is applied to the calculation of said correlation matrix.

45. The receiver according to claim 37, wherein at weighting function is applied to the calculation of said channel estimate correction factor.

46. The receiver according to claim 37, wherein said updated channel estimate is calculated using the equation $$\hat{\underline{h}}_i = \hat{\underline{h}}_{i-1} + Q_i^{-1} \cdot A_i^H W_i (\underline{y}_i - A_i \hat{\underline{h}}_{i-1})$$

where Q represents said correlation matrix, A represents data decisions, W represents a weighting factor, y represents said sample block, i represents a block index $\hat{h}_{i-1}$ represents said previous channel estimate.

47. The receiver according to claim 37, wherein said correlation matrix is factored using Cholesky decomposition.

48. An electronic data storage media storing a computer program operative to program a computer to execute the tracking process of claim 37.

49. A computer readable storage medium having a computer program embodied thereon for causing a suitably programmed system to track a fading mobile radio channel by performing the following steps when such program is executed on said system:
dividing a sequence of input data samples into a plurality of sample blocks;
processing a first sample block to calculate initial values for a correlation matrix and an channel estimate; for each subsequent sample block:
performing equalizer processing on a current sample block using said channel estimate; and
updating said correlation matrix and said channel estimate by generating preliminary data decisions on said next sample block by performing a traceback of an equalizer trellis over at least a length of said current sample block calculating an updated correlation matrix and a correction factor, and calculating an updated channel estimate utilizing said correction factor.

50. The computer readable storage medium according to claim 49, wherein said method is performed in a communications receiver operative to receive and decode a global system for mobile communication (GSM) signal.

51. The computer readable storage medium according to claim 49, wherein said input comprises 8-PSK symbols.

52. The computer readable storage medium according to claim 50, wherein said communication receiver comprises a convolutional decoder based on the Viterbi Algorithm (VA).

53. The computer readable storage medium according to claim 50, wherein said communications receiver comprises a de-interleaver whose output is subsequently input to a decoder.

54. The computer readable storage medium according to claim 49, wherein said channel estimate correction factor is calculated using the equation $$Q_i^{-1} A_i^H W_i(\underline{y}_i - A_i \underline{\hat{h}}_{i-1})$$

where Q represents said correlation matrix, A represents data decisions, W represents a weighting factor, y represents said sample block, i represents a block index and $A \cdot \underline{\hat{h}}$ represents said estimated samples.

55. The computer readable storage medium according to claim 49, wherein said data decisions are generated by performing a traceback of a trellis constructed by an equalizer.

56. The computer readable storage medium according to claim 49, wherein a weighting function is applied to the calculation of said correlation matrix.

57. The computer readable storage medium according to claim 49, wherein a weighting function is applied to the calculation of said channel estimate correction factor.

58. The computer readable storage medium according to claim 49, wherein said updated channel estimate is calculated using the equation $$\underline{\hat{h}}_i = \underline{\hat{h}}_{i-1} + Q_i^{-1} \cdot A_i^H W_i(\underline{y}_i - A_i \underline{\hat{h}}_{i-1})$$

where Q represents said correlation matrix, A represents data decisions, W represents a weighting factor, y represents said sample block, i represents a block index $\underline{\hat{h}}_{i-1}$ represents said previous channel estimate.

59. The computer readable storage medium according to claim 49, wherein said correlation matrix is factored using Cholesky decomposition.

60. A method of block based channel tracking, said method comprising the steps of:
dividing a sequence of input data samples into a plurality of sample blocks;
processing a first sample block to calculate initial values for a correlation matrix and a channel estimate; for each subsequent sample block:
performing equalizer processing on a current sample block using said channel estimate; and
updating said correlation matrix and said channel estimate by generating preliminary data decisions on said current sample block by performing a traceback of an equalizer trellis over at least a length of said current sample block calculating an updated correlation matrix and a correction factor, and calculating an updated channel estimate utilizing said correction factor.

* * * * *